United States Patent [19]

Grove et al.

[11] Patent Number: 4,610,780

[45] Date of Patent: Sep. 9, 1986

[54] METHOD FOR REMOVING SULFUR-CONTAINING IMPURITIES FROM HYDROCARBONS

[75] Inventors: J. Jay Grove, Alsip; John Mooi, Homewood, both of Ill.

[73] Assignee: Atlantic Richfield Company, Los Angeles, Calif.

[21] Appl. No.: 815,274

[22] Filed: Dec. 26, 1985

Related U.S. Application Data

[63] Continuation of Ser. No. 713,070, Mar. 18, 1985, abandoned, which is a continuation-in-part of Ser. No. 557,565, Dec. 2, 1983, abandoned.

[51] Int. Cl.$^4$ ............................................... C10G 29/00
[52] U.S. Cl. ................................... 208/244; 208/246; 208/247
[58] Field of Search .................. 208/244, 246, 247

[56] References Cited

U.S. PATENT DOCUMENTS

| | | | |
|---|---|---|---|
| 2,959,538 | 11/1960 | Weikart et al. | 208/247 |
| 4,113,606 | 9/1978 | Mulaskey | 208/244 |
| 4,163,708 | 8/1979 | Jacobson et al. | 208/89 |
| 4,179,361 | 12/1979 | Michlmayr | 208/246 |
| 4,204,947 | 5/1980 | Jacobson et al. | 208/246 |
| 4,225,417 | 9/1980 | Melson | 208/89 |
| 4,409,124 | 10/1983 | Robinson et al. | 208/246 |
| 4,419,224 | 12/1983 | Miller et al. | 208/244 |

*Primary Examiner*—Andrew H. Metz
*Assistant Examiner*—Helane Myers
*Attorney, Agent, or Firm*—F. Lindsey Scott

[57] ABSTRACT

A process is disclosed for removing sulfur-containing impurities from a liquid hydrocarbon stream wherein the optimum performance of a sulfur-removing material is achieved by selecting a material having a porosity which varies with the following formula:

$$(0.23 \pm K)(LHSV)^{1.7}RF^2$$

wherein
K = 0.12–1.55R;
(LHSV) is liquid hourly space velocity;
R is the ratio of volume-to-surface area of the sulfur-removing material; and
F is a fraction of impurities removed divided by the total impurities of the inlet stream.

14 Claims, 3 Drawing Figures

METHOD FOR REMOVING SULFUR-CONTAINING IMPURITIES FROM HYDROCARBONS

RELATED APPLICATION

This is a continuation of co-pending application Ser. No. 713,070 filed Mar. 18, 1985, abandoned.

Which is a continuation-in-part of application Ser. No. 557,565 filed Dec. 2, 1983 now abandoned.

FIELD OF THE INVENTION

This invention relates to a process for removing sulfur-containing impurities from a hydrocarbon fluid such as a refined hydrocarbon feed. More particularly, it relates to the removal of reactive sulfur-containing impurities by contacting a liquid hydrocarbon feed with a novel material having a predetermined porosity based upon the liquid hourly space velocity (LHSV) of the hydrocarbon feed, the volume-to-surface ratio of the material, and the fraction of the impurities to be removed from the feed.

BACKGROUND OF THE INVENTION

In refining crude oil, product streams typically contain a relatively minor amount of sulfur-containing impurities. Thiols, thiophenes, hydrogen sulfide, sulfur-containing heterocyclic organic compounds, and the like are common examples of such sulfur-containing impurities. Such impurities, however, reduce the desirability of a stream for many uses and may make it unacceptable as a feed for a precious metal catalyzed reformer unit. Also, current antipollution standards greatly limit the amount of sulfur that may be present both in hydrocarbon products and in stack gas emissions. For each of these reasons, it is desirable to find a way to reduce the amount of sulfur-containing impurities in a refined hydrocarbon feed.

To reduce the sulfur content of a refined hydrocarbon feed, it is known to contact it with a material containing copper, iron, nickel, zinc, and compounds thereof, especially where these materials are deposited upon an inert support material.

Pertinent art also includes U.S. Pat. No. 4,113,606, which discloses an improved process for removing an impurity such as sulfur from a refined hydrocarbon feed by contacting the feed with a sulfur-removing material under hydrocarbon sulfur-removing conditions. The improved process employs a solid sulfur-removing material having a pore volume of at least 0.15 cc. per cc., of which at least 5 percent is contained in pores having a diameter in the range 0.1 to 15 microns. A satisfactory material is disclosed having a pore volume in the range 0.15 to 0.8 cc. per cc., and higher; a surface area in the range of from about 2 to 700 square meters per gram; and at least 5 percent of the pore volume in pores having a diameter in the range 0.1 to 15 microns. Emphasized in this reference is the critical importance of pore diameter as determined by the mercury porosimetry method. The presence of a relatively high content of large macropores in the range of 0.1 to 15 microns of a sulfur-removing material was asserted to permit the use of an increased liquid hourly space velocity (LHSV) without diffusion limitation problems and without risk of hydrogen sulfide carry-over into the reformer unit.

Additionally, U.S. Pat. No. 4,163,708 discloses a process for removing thiol impurity from hydrocarbon feed by contacting the feed with a sulfur-removing material at a temperature ranging from about 120° to 400° C. The scavenger is disclosed to be a composite having a copper component and an inorganic porous carrier and having a surface area in the range from about 20 and 1000 square meters per gram.

Not disclosed in any of the pertinent references is the unexpected optimal relationship between porosity and both catalyst reactivity and useful life. The essence of the instant invention is that it is not pore diameter, but rather porosity, that is critical to scavenging activity and catalyst life.

It is an object of this invention to overcome diffusion limitations otherwise limiting the effectiveness of sulfur-removing materials while maintaining the useful life and performance of catalysts.

Other objects of this invention will be clear to one of skill in the art based upon this Specification.

SUMMARY OF THE INVENTION

Broadly, this invention is directed to an improved process for removing reactive sulfur-containing species from hydrocarbons, preferably refined hydrocarbon feeds such as hydrocrackates. The process to be improved involves contacting a liquid hydrocarbon stream at a temperature in the range of from about 200° to about 500° F., and preferably in the range of from about 250° to about 350° F., and at a pressure in the range of from about 0 to about 700 pounds per square inch (psi), and preferably in the range of from about 175 to about 550 psi, which flows at a liquid hourly space velocity (feed volume/hour of feed/reaction zone volume) of up to about 25 hr.$^{-1}$ through a reaction zone containing a sulfur-removing material. The material includes a sulfur-removing reactant and a support. The material consists of a sulfur-removing reactant in an amount equal to at least 15 percent of the total weight of both the reactant and the support, and preferably at least 20 percent by weight. The material consisting of both the support and the supported sulfur-scavenging reactant is selected to have a porosity determined from the following equation:

$$(0.23 \pm K)(LHSV)^{1.7} RF^2$$

wherein $$K = 0.12 - 1.55R;$$

- LHSV is liquid hourly space velocity in cubic centimeters divided by the hour of feed and the cubic centimeters of the reaction zone volume;
- R is the ratio, in centimeters, of volume-to-surface area of the sulfur-removing material and ranges from about 0.01 cm. to about 0.06 cm.; and
- F is a fraction of the entrance impurity concentration less the exit impurity concentration divided by the entrance concentration.

DETAILED DESCRIPTION OF THE INVENTION

Figure 1:
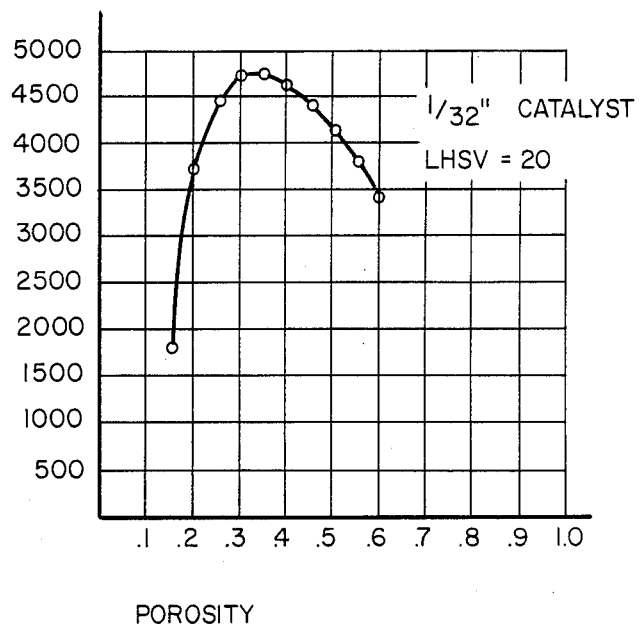
FIG. 1 is a plot of hours of sulfur removal, at which at least 75 percent of the sulfur is removed from an inlet stream, versus porosity of the sulfur-removing material having a length of 1/32 inch and subjected to an LHSV of 20 hr.$^{-1}$.

Porosity has been found to be critical to the effective removal of sulfur from a hydrocarbon stream under this invention. The porosity is measured by a helium-mercury method. In the method, extruded or tabletted sulfur-removing material is placed in a measured void volume submerged at 1 atmosphere in a measured volume of mercury. The measured volume of material is then filled with a measured volume of helium to 1 atmosphere. The difference between the measured void volume and the measured mercury volume is the volume of the sulfur-removing material. The difference between the measured volumes of helium and mercury is the volume in pores. The porosity is the ratio of the volume in pores to the volume of the tablets.

The mercury measurement of the helium-mercury method is used at 1 atmosphere pressure. At higher pressures, the mercury penetrates more of the pores of the tablets. The volume of the pores that can be penetrated by the mercury is dependent on the size of the pores and the pressure applied to the mercury. Thus, pore size distribution may be determined by varying the pressure above 1 atmosphere. It has been discovered that pore size distribution has little or no effect on the ability of the materials of this invention to absorb sulfur from hydrocarbons in the liquid phase.

To determine the proper porosity of a sulfur-removing material, this invention directly relates the porosity to the product of the space velocity, the removal factor, and the sulfur-removing material volume-to-surface area. In the event that the porosity exceeds 0.95, either the space velocity must be lowered or the catalyst size must be decreased. If the space velocity exceeds an LHSV of 20 hr.$^{-1}$, the size of the catalyst under normal conditions cannot exceed 1/12 inch. If the LHSV of the stream approaches 25 hr.$^{-1}$, the size of the catalyst decreases to about 1/32 inch.

The selection of the proper porosity is critical to the proper removal of sulfur and the operating cycle of the catalyst. If the porosity is too low, the catalyst operating cycle will be shortened; whereas, a porosity too high will diminish sulfur removal.

Porosity, for the purposes of this Specification and claims, is the fraction of volume in pores divided by the total volume of the tablet or extruded particle. The total volume includes both the volume of pores and the volume of the solid phase.

With respect to the porosity and its determination from the formula, the term "R" has a preferred range of from about 0.015 cm. to about 0.05 cm.; F is in the range of from about 0.4 to about 0.9, and preferably in the range of from about 0.5 to about 0.8.

Suitable materials which function as sulfur-removing materials useful in removing reactive sulfur-containing species from a hydrocarbon feedstock, particularly in this invention, are disclosed in U.S. Pat. Nos. 4,163,708; 4,225,417; and 4,113,606, which are incorporated herein by reference. Copper, iron, nickel, zinc, and compounds thereof have been found particularly useful and, therefore, are preferred, and nickel and copper are more preferred.

Examples of refractory inorganic oxide supports that are particularly suitable for use in this invention include alumina, silica, zirconia, boria, chromia, magnesia, titania, and the like, or composites thereof such as alumina-silica, alumina-zirconia, and the like. Alumina is a preferred refractory inorganic oxide, especially an alumina derived from an alpha-alumina monohydrate by calcination.

The weight ration of reactant to support is preferred to be at least about 1:9, and more preferably at least about 2:8.

The extrusion operation is suitably effected with commercially available extrusion equipment. For example, the dough is continuously processed through a cylinder by means of a rotating screw and pressured through a perforated plate at one end of the cylinder. Prior to drying and calcining, the extrudate may be cut into particles of desired length by means of a rotating knife as the extrudate emerges from the perforated plate.

Alternatively, the extrudate may be broken into particles of random length during the drying and calcining process. In any case, the extrudate is calcined, preferably in an oxidizing atmosphere such as air, at a temperature of from about 600° to about 1200° F. over a period of from about 2 to about 4 hours.

The dry-mixing operation is improved utilizing an alpha-alumina monohydrate characterized by a weight loss on ignition at 900° C. of from about 20 to about 30 weight percent. In addition to its contribution to the catalytic properties of the sulfur-removing material of this invention, the alpha-alumina monohydrate improves the extrusion characteristics of the mixture whereby the mixture is readily extruded through a 1/32 to ⅛ inch orifice at a pressure of less than about 500 psi.

Impregnation of the calcined extrudate can be accomplished by conventional techniques whereby the extrudate particles are soaked, dipped, suspended or otherwise immersed in the impregnating solution at conditions to absorb a soluble compound comprising the desired catalytic component.

The porosity of tablets formed by extrusion may be modified by a variety of known means. Changes in the mix/mulling time used to prepare the extrudable dough will change the porosity—longer mix/mulling time will lower the porosity. The acidity/alkalinity of the extrusion mix changes the porosity—the more the alkalinity, the higher the porosity. The inclusion of calcined, spray-dried particles in the extrusion mix will increase the porosity by adding pores of large diameter. The use of surfactants or low surface tension liquids in the extrusion step will increase the porosity by increasing the volume in the small gel pores. For purposes of this invention, any means to vary the porosity is adequate since pore size distribution is not critical.

The catalyst may be conventionally loaded into a reaction zone. Preferably, the catalyst will be loaded to form a dense pack within the zone. A more preferred method of loading the catalyst is provided in U.S. Pat. No. 3,668,115, Uhl et al., assigned to Atlantic Richfield Company, which discloses a method for orienting the catalyst while loading to form a pack having very high unit density.

EXAMPLE

Two hundred grams of Catapal alumina and 800 grams of copper carbonate were stirred into a 105 ml. aqueous solution of 6 grams of nitric acid, followed by the addition of 35 ml. of water. Preferably, the water is distilled and substantially free of cations and anions. A final 500 ml. of water was added and the mixture mulled by conventional methods. The mulled material was then extruded to form 1/16-inch diameter cylinders and oven dried at 270° F. The material was then calcined in air for 3 hours at 932° F.

The porosity of the material is determined by helium-mercury displacement. A weighed sample is placed in a pycnometer with provisions for evacuating, for admitting helium, and for admitting mercury. After evacuation, a measured quantity of helium is expanded into the pycnometer to determine the volume displaced by the solid. The solid density (SD) is calculated by dividing the weight of the solid by the volume displaced by the solid.

After removal of the helium by evacuation, the volume displaced by the particles (=solid+pores) is determined by mesuring the volume of mercury to fill the pycnometer, from which the pill density (PD) is calculated. The pore volume is the difference between the helium volume and the mercury volume, divided by the weight of the sample, and is expressed as cubic centimeters per gram. Alternatively, the pore volume is calculated by 1/PD-1/SD. Porosity is the fraction of pill volume occupied by pores, expressed as cubic centimeters, divided by cubic centimeters, and is calculated as pore volume multiplied by pill density.

The finished sulfur-removing material has a pore volume of 0.478, a pill density in gm./c.c. of 1.43, a solid density in gm./c.c. of 4.52, and a porosity of 0.68. The prepared material is charged to a 1-inch ID tube used for fixed-bed operation. An n-heptyl mercaptan is dissolved in a hydrotreated petroleum naphtha to determine the effectiveness of sulfur removal of the prepared sulfur-removing material. This sulfur-containing naphtha hydrocarbon is passed over the sulfur-removing material in the reactor tube at varying conditions of flow rate, temperature and pressure. Suitable conditions include an LHSV of about 20 hr.$^{-1}$, a temperature of about 300° F., and a pressure of about 400 psi.

Figure 2:
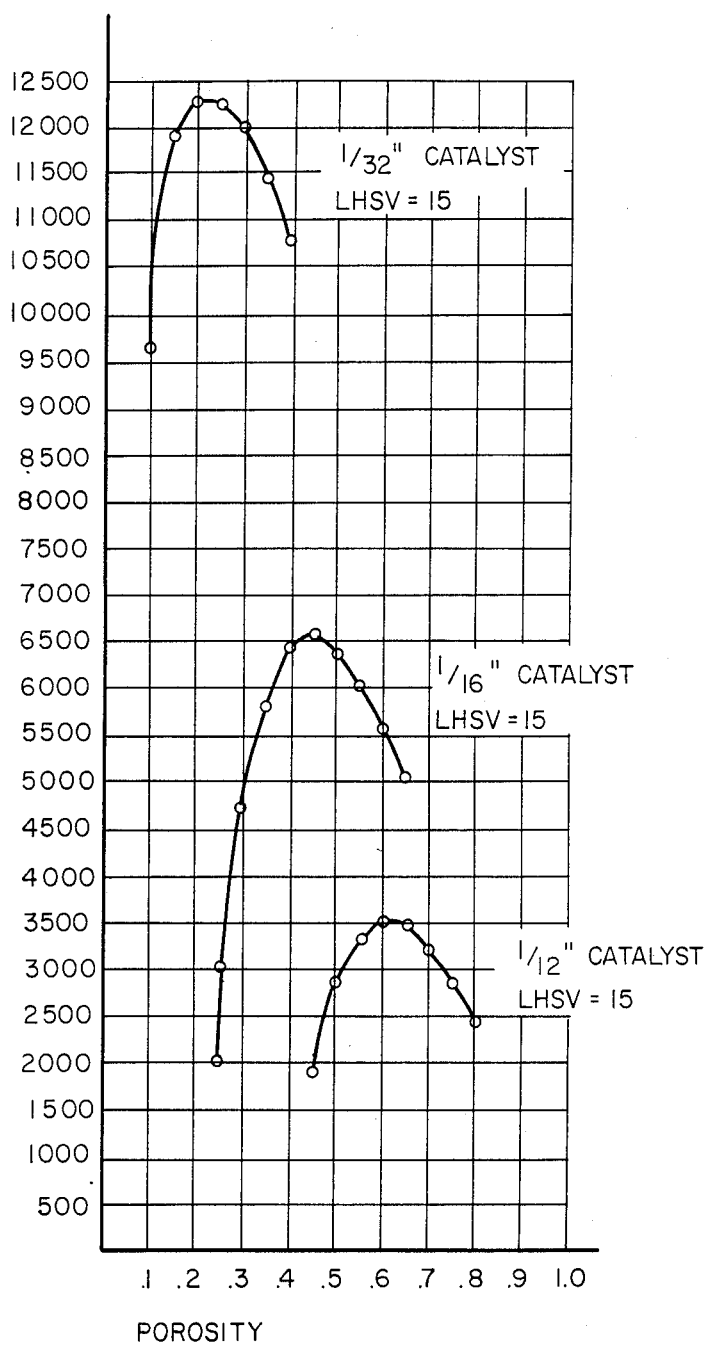
FIG. 2 contains three plots of hours of sulfur removal, at which at least 75 percent of the sulfur is removed from an inlet stream, versus porosity of the sulfur-removing material having lengths of 1/32, 1/16, and 1/12 inch, respectively, and subjected to an LHSV of 15 hr.$^{-1}$.
Figure 3:
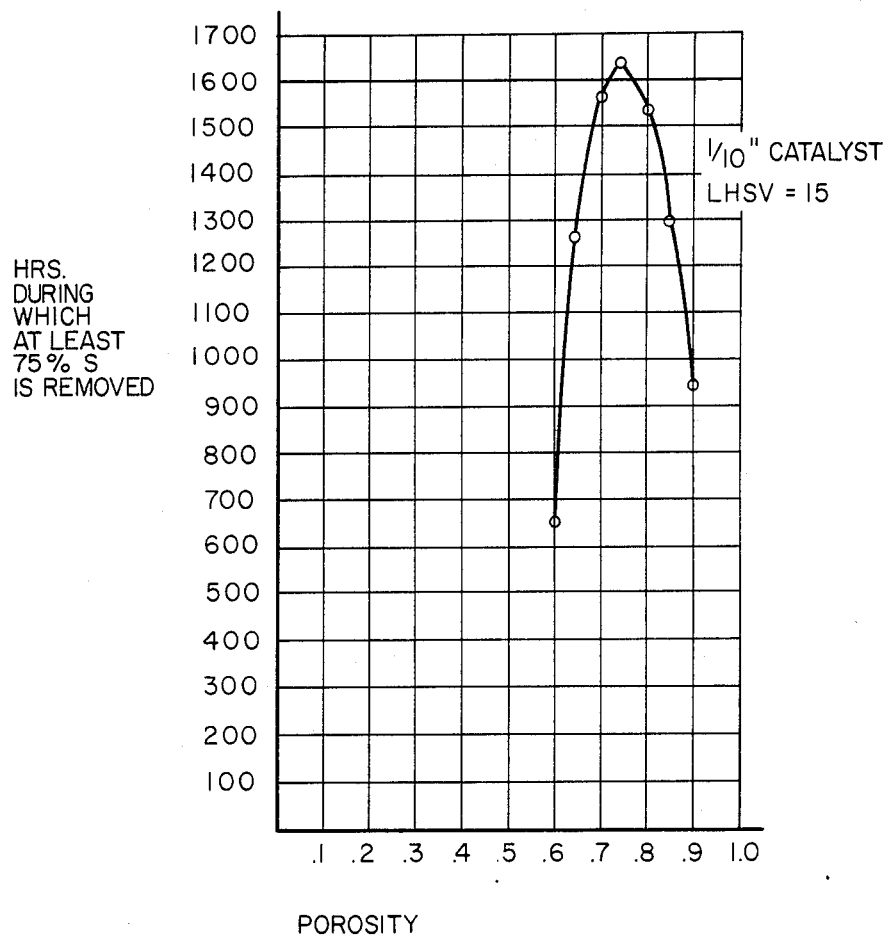
FIG. 3 is a plot of hours of sulfur removal, at which at least 75 percent of the sulfur is removed from an inlet stream, versus porosity of the sulfur-removing material having a length of 1/10 inch and subjected to an LHSV of 15 hr.$^{-1}$.

Analytical techniques of X-ray fluorescence or titration are useful means to determine the amount of sulfur remaining in the feedback subsequent to contacting in the above-described fixed bed. Repeating of the experiment for each of the materials appropriate to the series is shown in FIGS. 1 through 3 where sulfur removal of at least 75 percent is plotted versus porosity for various catalyst sizes and LHSV's. The variation in the initial reactivity of a material does not change the location of the optimum porosity for the material with respect to the LHSV and the catalyst ratio.

Variations on the specific embodiments disclosed are readily understood by one of skill in the art and these variations are intended to be part of Applicants' disclosed invention.

The invention which is claimed is:

1. In a process for optimizing a given job of removing a predetermined proportion of sulfur-containing impurities from a given flow rate of a given liquid hydrocarbon stream having predetermined initial and final concentrations of sulfur-containing impurities and having a predetermined size reaction vessel for removal of the sulfurcontaining impurities, the improvement comprising removing sulfur from said liquid hydrocarbon stream under sulfur removing conditions by emplacing a sulfur-removing material in the reaction vessel and contacting in said reaction vessel said stream with said sulfur-removing material; said sulfur-removing material having a porosity selected in accordance with the formula.

$$P = (0.23 \pm K) \times (LHSV)^{1.7} \times R \times F^2$$

wherein:

P is porosity;
K=0.121.55R;
LHSV is liquid hourly space velocity;
R is the ratio, in centimeters, of volume-tosurface area of said sulfur-removing material and ranges from about 0.01 cm. to about 0.06 cm.; and
F is a fraction equal to the proportion of sulfur-containing impurities removed, more specifically defined as the concentration of said sulfur containing impurities in said stream entering the contacting process less the concentration of said impurities in said stream exiting said process divided by the concentration of said impurities in said stream entering said process.

2. The process of claim 1 wherein the ratio, R, ranges from about 0.015 cm. to about 0.05 cm.

3. The process of claim 1 wherein said sulfur-removing material comprises a reactant and a support.

4. The process of claim 3 wherein the weight ratio of said reactant to said support is at least about 1:9.

5. The process of claim 4 wherein the weight ratio of said reactant to said support is at least about 2:8.

6. The process of claim 3 wherein said support is selected from a group consisting of alumina, silica, zirconia, boria, chromia, magnesia, titania, alumina-silica, alumina-zirconia, and compounds thereof.

7. The process of claim 3 wherein said reactant is selected from a group consisting of copper, iron, nickel, zinc, and compounds thereof.

8. The process of claim 4 wherein said reactant is selected from a group consisting of copper and nickel.

9. The process of claim 5 wherein said support is alumina.

10. The process of claim 1 wherein said F ranges from about 0.4 to about 0.9.

11. The process of claim 10 wherein said F ranges from about 0.5 to about 0.8.

12. The process of claim 1 wherein said LHSV is less than 25 hr.$^{-1}$.

13. The process of claim 12 wherein said LSHV is no more than 20 hr. 1 and said catalyst size is no more than 1/12 inch.

14. The process of claim 12 wherein said LHSV is about 15 hr.$-1$.

* * * * *